(No Model.) 3 Sheets—Sheet 1.
J. SMYTH.
ASH SIFTER.
No. 598,962. Patented Feb. 15, 1898.
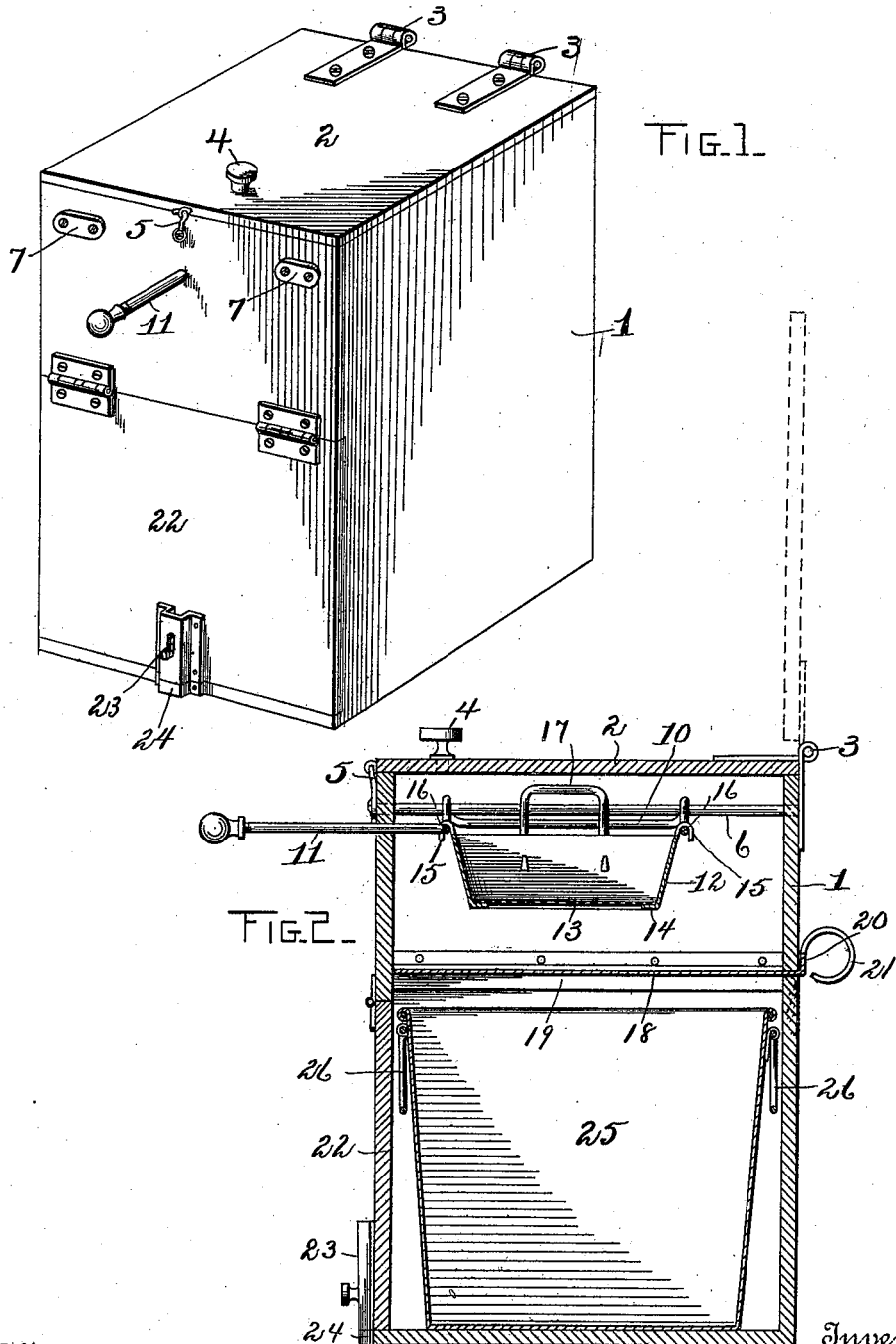
Witnesses
Carroll J. Webster
G. E. Warner
Inventor
Joseph Smyth
By Glascock &co
Attorneys (No Model.) 3 Sheets—Sheet 2.
J. SMYTH.
ASH SIFTER.
No. 598,962. Patented Feb. 15, 1898.
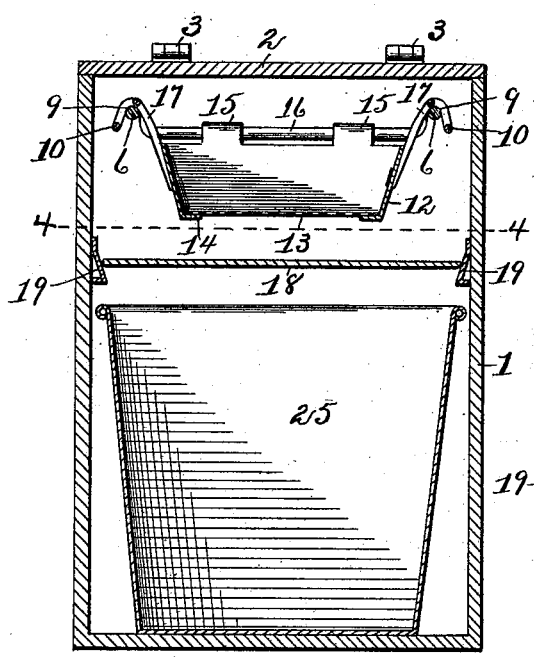
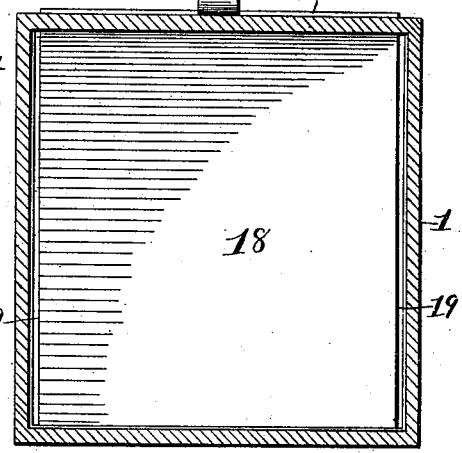
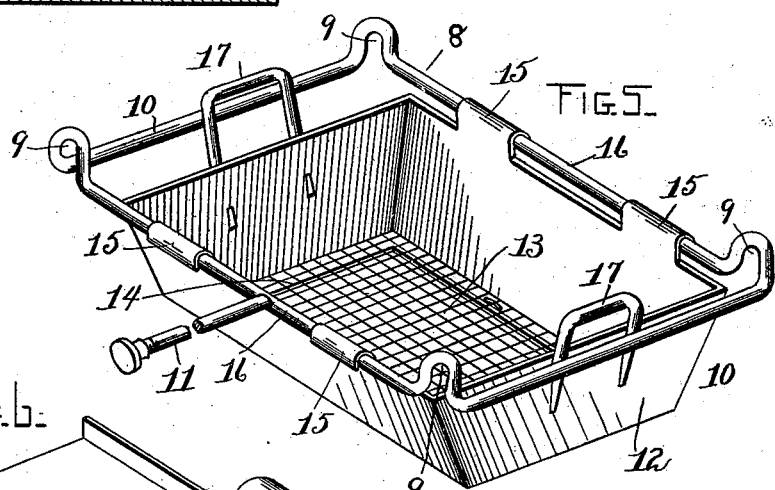
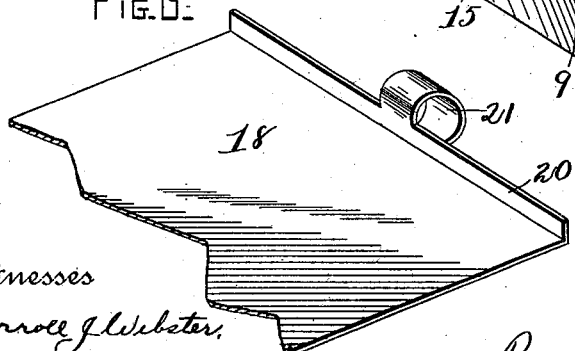
Witnesses
Carroll J. Webster.
G. E. Warner.
Inventor
Joseph Smyth.
By Glascock & Co
Attorneys (No Model.) 3 Sheets—Sheet 3.

J. SMYTH.
ASH SIFTER.

No. 598,962. Patented Feb. 15, 1898.

Witnesses:
L. C. Hills.
W. A. Roberts.

Inventor:
Joseph Smyth
By Glasscock
Attys.

UNITED STATES PATENT OFFICE.

JOSEPH SMYTH, OF ALLENTOWN, PENNSYLVANIA.

ASH-SIFTER.

SPECIFICATION forming part of Letters Patent No. 598,962, dated February 15, 1898.

Application filed March 3, 1897. Serial No. 625,862. (No model.)

*To all whom it may concern:*

Be it known that I, JOSEPH SMYTH, a citizen of the United States, residing at Allentown, in the county of Lehigh and State of Pennsylvania, have invented a certain new, useful, and valuable Improvement in Ash-Sifters, of which the following is a full, clear, and exact description.

My invention has relation to ash-sifters;
and it consists in the novel construction and arrangement of its parts, as hereinafter described.

Figure 7:
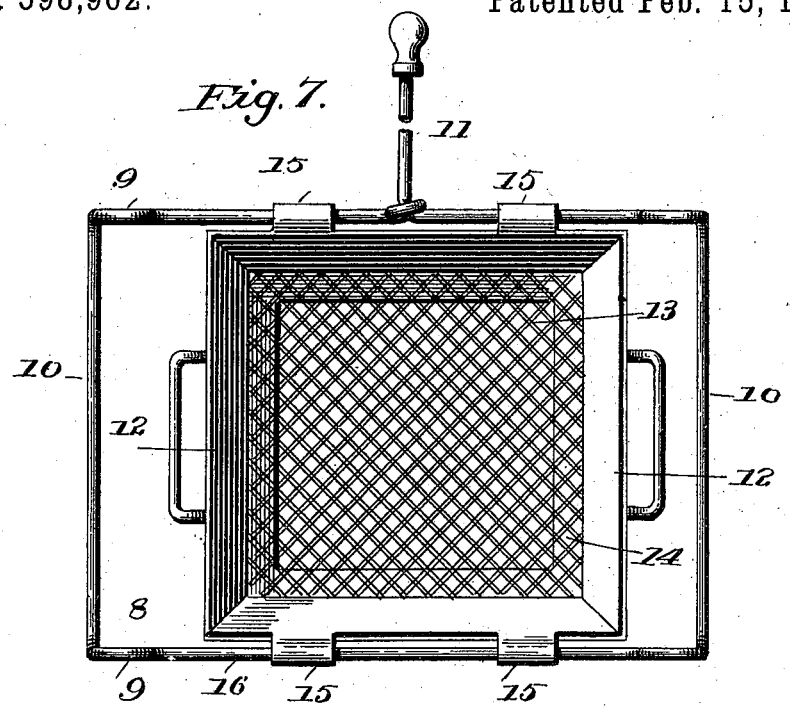
Figure 8:
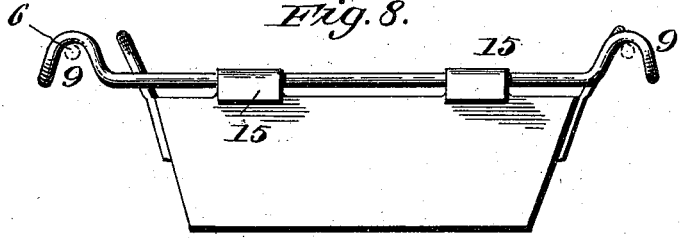
Figure 9:
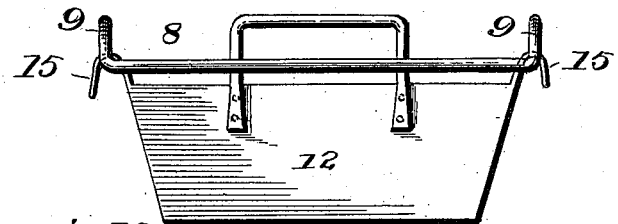
Figure 10:
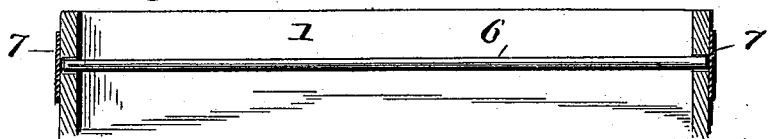

Figure 1 is a perspective view of the sifter. Fig. 2 is a lateral sectional view of the sifter.
Fig. 3 is a transverse sectional view of the sifter. Fig. 4 is a horizontal view cut on the line 4 4 of Fig. 3. Fig. 5 is a perspective view of the pan and shifting frame for holding the same. Fig. 6 is a perspective view of one end of a diaphragm-plate used in the sifter. Fig. 7 is a top plan view of the shifting frame, showing the removable pan located thereon. Fig. 8 is an end elevation of the shifting frame, showing the removable pan located thereon. Fig. 9 is a side elevation of the shaft-frame, showing the removable pan located thereon. Fig. 10 is a sectional view of the casing, showing the method of securing the horizontal rods therein.

The object of my invention is to provide a sifter that will thoroughly remove the ashes from the cinders and deposit the ashes in a suitable receptacle and retain the cinders within a removable pan.

The further object of the invention is to provide a sifter that is thoroughly tight and will absolutely prevent the escapement of any dust, &c.

The further object of the invention is to provide the sifter with a shifting diaphragm-plate which when the sifter is open at the top to remove the cinders will prevent any dust from escaping from the compartment in which the siftings are deposited.

The further object of the invention is to provide a device simple in construction and easy in operation.

The sifter consists of the casing 1, which may be made of wood, galvanized iron, or heavy tin. The top 2 is hinged to the casing. The hinges 3 are so placed that the top 2 will tightly close the upper end of the casing, as shown in the sectional view, Fig. 2. The top may be provided with a knob 4, and a hook 5 may be located on the front of the casing to securely hold the top 2 down.

The rods 6 6 are parallel to each other, and they extend from the front to the rear side of the sifter. The ends of said rods are located in suitable perforations in the said sides of the sifter, and after said rods are inserted the perforations are covered by the plates 7 7, as shown in Fig. 1, and thus the said rods are firmly held in place. A rectangular frame 8 is adapted to pass back and forth on the said rods. Said frame has at each corner an upwardly-inclined recess 9, bent in the wire forming the frame. The outer ends of the recesses on each side are connected by the section 10 of the wire. The recesses 9 9 are adapted to receive the parallel rods 6 6, as shown in Fig. 3, and the sections 10 of the said frame are substantially parallel to the rods 6 when the frame is in position on said rods. The frame is provided with the horizontal rod 11, which extends through the front of the sifter, said rod having at its extreme outer end a suitable handle, by means of which the frame is operated.

The sifting-pan consists of the sheet metallic sides or body portion 12. Said pan is provided in its bottom with the netting or perforated sheet metal 13, said netting or sheet metal being supported and secured to the horizontal flanges 14 of the sides. The front and rear sides of the pan are provided with the lugs 15, said lugs being a continuation of the metal forming the front and rear sides, and said lugs are curled in order to receive the front and rear bars 16 16, which form the frame 8. Thus the pan is held in position on the frame. The pan at each end is provided with a U-shaped handle 17, the ends of said handle being pressed through the sheet metal forming the ends of the pan, and the extreme ends of the said handle are clenched up against the sheet, as shown in Fig. 5, and thus the handles are firmly attached to the pan.

The sifting-pan is independent of the rectangular frame 8, said pan being held in position on the said frame by means of the lugs 15. The pan may be removed readily from the frame when the ashes have been separated from the cinders.

A diaphragm-plate 18 is adapted to pass through an opening in the back of the sifter. The said plate is guided in the interior of the sifter by means of the sloping guides 19 19. The beveled upper surfaces of the guides 19 19 serve a double purpose—that is, they support the diaphragm-plate 18, and any ashes or dust that accumulates on said beveled surfaces is conveyed into the receptacle 25, and the said ashes or dust is thereby prevented from passing down between the sides of the receptacle 25 and the lower part of the casing. Said guides may be made of sheet metal, as shown in Fig. 3, or they may be made of wood. The rear end of the plate 18 is provided with the upwardly-extending flange 20. Said flange is adapted to positively close the opening in the back of the sifter when the diaphragm 18 is in position, as shown in Fig. 2. The upper edge of the flange 20 is provided with a protrusion 21, which is curled and forms a handle, by means of which the plate 18 may be withdrawn from the sifter or placed therein.

The front lower section 22 of the sifter is hinged, as shown in Fig. 1. The lower edge of said section is provided with a gravity-bolt 23, which when the said section is closed is adapted to engage the staple 24, attached to the lower and stationary edge of the sifter-casing. The metal receptacle 25 is adapted to slip horizontally within the casing or when the section 22 is swung upon its hinges. The receptacle 25 when in position is adapted to receive all the siftings from the vibrating pan in the upper part of the casing—that is, when the diaphragm 18 is removed from the casing. The said receptacle 25 is provided at its front and rear sides with a handle 26, as shown in Fig. 2.

The device is operated as follows: The receptacle 25 is in position, as shown in Figs. 2 and 3. The pan 12 is placed in position on the frame 8, and the ashes are poured in the pan, and a large amount of the ashes immediately fall through the screen in the bottom of the pan, and the lid or top 2 is closed and held down by means of the hook 5. The diaphragm-plate 18 is removed from the sifter, and the hinged section 22 is closed. The operator quickly moves the pan 12 back and forth by means of the handle 11, and the siftings in the said pan pass through the screen or perforated bottom thereof and are deposited in the receptacle 25. The cinders remain in the pan. When the operator is satisfied that all of the siftings are separated from the cinders, he inserts the diaphragm 18 in the position shown in Fig. 2. This retains all of the dust from the siftings in the compartment forming the lower part of the casing 1 and in the receptacle 25. The top 2 is then opened, and the pan 12 is removed. The top is immediately closed and a minimum amount of dust has been permitted to escape from the sifter.

Having described my invention, what I claim as new, and desire to secure by Letters Patent, is—

An ash-sifter consisting of a suitable receptacle, horizontal rods located above said receptacle, a frame consisting of a single rod formed in the shape of a rectangular loop, said loop having at its four corners suitable recesses formed in the rod, said recesses being adapted to receive the horizontal rods, a handle secured to said frame and extending through a perpendicular side of the sifter, a removable pan adapted to be supported by the frame.

In testimony whereof I affix my signature in presence of two witnesses.

JOSEPH SMYTH.

Witnesses:
ROBERT L. STUART,
FRANK M. TREXLER.